(12) United States Patent
Pitsakis

(10) Patent No.: US 8,481,900 B2
(45) Date of Patent: Jul. 9, 2013

(54) METHODS FOR DRYING CERAMIC MATERIALS

(75) Inventor: Jesus Humberto Armenta Pitsakis, Painted Post, NY (US)

(73) Assignee: Corning Incorporated, Corning, NY (US)

(*) Notice: Subject to any disclaimer, the term of this patent is extended or adjusted under 35 U.S.C. 154(b) by 823 days.

(21) Appl. No.: 12/626,155

(22) Filed: Nov. 25, 2009

(65) Prior Publication Data

US 2011/0120991 A1    May 26, 2011

(51) Int. Cl.
*H05B 6/78* (2006.01)

(52) U.S. Cl.
USPC .......................................... 219/700; 219/702

(58) Field of Classification Search
USPC .................................. 219/700, 702
See application file for complete search history.

(56) References Cited

U.S. PATENT DOCUMENTS

| | | | | |
|---|---|---|---|---|
| 3,704,523 A | * | 12/1972 | Guerga et al. | 34/264 |
| 4,687,895 A | * | 8/1987 | Chitre et al. | 219/701 |
| 6,259,078 B1 | * | 7/2001 | Araya | 219/709 |
| 6,455,826 B1 | | 9/2002 | Araya et al. | |
| 2004/0104514 A1 | | 6/2004 | Ishikawa et al. | |
| 2005/0093209 A1 | | 5/2005 | Bergman et al. | |
| 2010/0043248 A1 | | 2/2010 | Cervoni et al. | |
| 2010/0108667 A1 | * | 5/2010 | Harihara et al. | 219/704 |

FOREIGN PATENT DOCUMENTS

| | | |
|---|---|---|
| EP | 1 441 919 | 7/2004 |
| WO | 2008/013718 | 1/2008 |
| WO | 2008/121263 | 10/2008 |
| WO | 2010/051337 | 5/2010 |

* cited by examiner

*Primary Examiner* — Tom Thomas
*Assistant Examiner* — Christopher M Roland
(74) *Attorney, Agent, or Firm* — Charles A. Greene

(57) ABSTRACT

Methods for drying ceramic materials are provided. In one embodiment, a first power set-point of a first microwave applicator of a drying apparatus is determined Power set-points for at least two additional microwave applicators in the drying apparatus are determined such that a power distribution among the microwave applicators provides an energy per unit of water profile for the additional microwave applicators that is substantially uniform. The microwave applicators may be operated at the determined power set-points as the ceramic material is passed through the drying apparatus.

18 Claims, 4 Drawing Sheets

METHODS FOR DRYING CERAMIC MATERIALS

BACKGROUND

1. Field

The present specification generally relates to methods for processing ceramic materials and, more specifically, to methods for processing and drying ceramic materials using a microwave drying apparatus.

2. Technical Background

Microwave heating may be utilized to remove moisture from moister-laden ceramic materials by providing energy directly to an interior region of the ceramic material being dried. In microwave drying apparatuses having multiple microwave applicators, the output power provided by each microwave applicator may be individually adjusted. Conventionally, power set-points corresponding to an output power of the microwave applicators are determined by calculating the total microwave power needed to dry a particular ceramic material. A distribution of the total microwave power among the microwave applicators is then determined based on subjective experience and trial and error.

The conventional methods of setting up a microwave drying apparatus for the drying of ceramic materials may be time consuming and costly because significant resources and material may be required to determine the proper power set-points for a particular ceramic material product. For example, it may take up to a day or more to develop the proper microwave applicator power set-points for particular ceramic material products.

Accordingly, a need exists for alternative methods for determining power set-points for microwave applicators in microwave drying apparatus.

SUMMARY

In one embodiment, a method for drying a ceramic material may include determining a power set-point of a first microwave applicator of a drying apparatus and determining a power set-point for at least two additional microwave applicators in the drying apparatus such that a power distribution among the microwave applicators provides an energy per unit of water profile for the additional microwave applicators that is substantially uniform. The method may further include operating the microwave applicators at the determined power set-points as the ceramic material is passed through the drying apparatus.

In another embodiment, a method for drying a ceramic material may include determining a power set-point of a first microwave applicator of a drying apparatus and determining a power set-point for at least two additional microwave applicators in the drying apparatus such that a power distribution among the microwave applicators provides an energy per unit of water profile for the additional microwave applicators that is substantially uniform. The power set-points of each of the additional microwave applicators may be defined by:

$$D_j = \frac{1/DryT - \sum_{k=1}^{j-1} D_k}{\frac{TP*TimeMA}{PEWL*IWL*LA*DryT} + 1/2}, \quad j = 2 \text{ to } n-1, \text{ and}$$

$$D_n = 100\% - \sum_{i=1}^{n-1} D_i,$$

where $D_j$ is the power set-point of microwave applicator $D_j$ in percent of the total microwave power value; $D_n$ is the power set-point of microwave applicator $D_n$ in percent of the total microwave power value; DryT is a percent of dryness target of the ceramic material; TP is the total microwave power value in kW; TimeMA is a time of the ceramic material in microwave applicator $D_j$ in seconds; PEWL is a potential energy per water content limit value in kJ/lb of water; IWL is an initial ceramic material water content in lbs; and LA is a number of ceramic materials per microwave applicator. The microwave applicators may be operated at the determined power set-points as the material is passed through the drying apparatus.

In yet another embodiment, a method for processing a ceramic material in drying apparatus including a succession of microwave applicators may include determining a total microwave power value to be applied to an extruded ceramic material. A first microwave applicator of the succession of microwave applicators may be operated at a first microwave applicator power set-point. Each of the remaining microwave applicators of the succession of microwave applicators may be operated at power set-points such that energy per unit of water values among the remaining microwave applicators do not vary by more than about 100 kJ/lb of water. The ceramic material may be passed through the drying apparatus.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description present embodiments of the present disclosure, and are intended to provide an overview or framework for understanding the nature and character of the embodiments claimed herein. The accompanying drawings are included to provide a further understanding of the embodiments disclosed herein, and are incorporated into and constitute a part of this specification. The drawings illustrate various embodiments of the present disclosure and together with the description serve to explain the principles and operations of the embodiments described herein.

DETAILED DESCRIPTION OF THE PREFERRED EMBODIMENTS

Figure 1B:
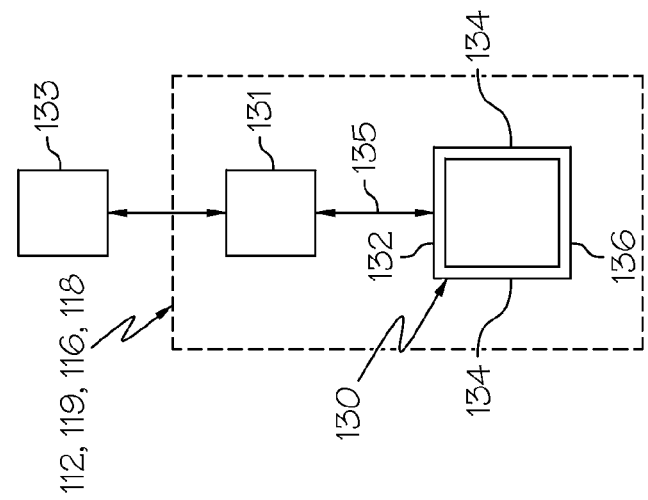
FIG. 1B is a schematic view of controller and a microwave applicator of a drying apparatus according to one or more embodiments shown and described herein.

Reference will now be made in detail to various embodiments for microwave drying ceramic materials, examples of which are illustrated in the accompanying drawings. Whenever possible, the same reference numerals will be used throughout the drawings to refer to the same or like parts.

As described herein, methods for drying and processing ceramic materials may generally comprise determining a plurality of power set-points corresponding to three or more microwave applicators of a microwave drying apparatus. In one embodiment, the first microwave applicator of a succession of microwave applicators may be operated at a power set-point that is near a maximum output power of the first microwave applicator (e.g., approximately 90 kW in one embodiment). The power-set points of the remaining or additional microwave applicators may be chosen such that a substantially uniform profile of energy per unit of water values is provided among the remaining or additional microwave applicators (i.e., all of the microwave applicators other than the first microwave applicator).

Figure 1A:
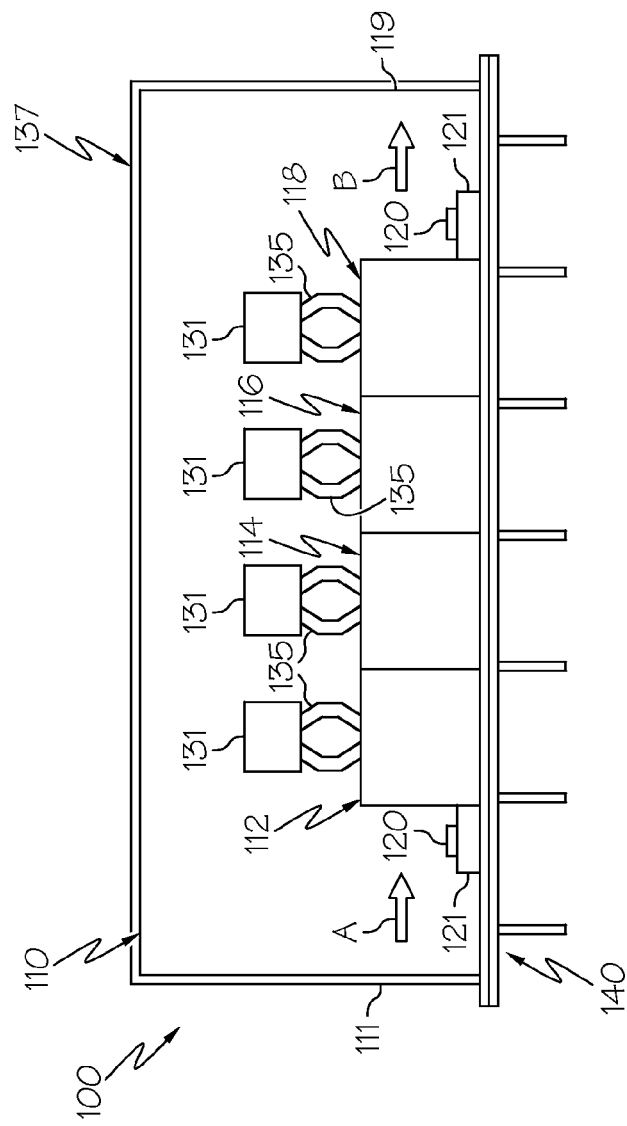
FIG. 1A is a schematic view of a dryer apparatus for drying ceramic material with microwaves according to one or more embodiments shown and described herein.

Referring to FIG. 1A, a ceramic material manufacturing system 100 may comprise a microwave drying apparatus 110 to dry extruded and moisture-laden ceramic material that has been cut into ceramic articles 120. Although embodiments may be described in the context of ceramic articles that have been cut from ceramic materials, this disclosure is not limited thereto. For example, embodiments described herein may be utilized to dry ceramic materials that have been further cut into smaller articles. The ceramic articles 120 may be provided in a variety of shapes, sizes and configurations. As an example and not a limitation, the ceramic articles 120 may be green thin-walled ceramic green bodies for use as fuel filters in vehicles. The ceramic articles 120 may have round, oval, or other geometric shapes.

The microwave drying apparatus 110 comprises an entrance 111, an exit 119, and a plurality of microwave applicators 112, 114, 116, 118 within a housing 137. The housing 137 fully encloses the microwave applicators 112, 114, 116, 118 and is shown in cross section for illustration purposes. Although the embodiment illustrated in FIG. 1A depicts a microwave drying apparatus 110 having four microwave applicators, embodiments are not limited thereto. For example, embodiments of the present disclosure may be implemented in microwave drying apparatuses having three or more microwave applicators. Further, it should be understood that FIGS. 1A and 1B are schematic representations and are not intended to limit the configuration of the microwave drying apparatus 110 or its related components. For example, the microwave applicators 112, 114, 116, 118 may be separated by a gap between each applicator.

As illustrated in FIGS. 1A and 1B, microwave applicators 112, 114, 116, 118 for heating ceramic material generally comprises a microwave source 131, a microwave chamber 130, and a waveguide assembly 135. The microwave applicators 112, 114, 116, 118 may be controlled by a controller 133. The microwave chamber 130 generally comprises sidewalls 134, a top 132 and a bottom 136. In one embodiment, the sidewalls 134, top 132, and bottom 136 may be formed from a microwave-impermeable, non-magnetic material that exhibits a high electrical conductivity and resistance to oxidation at temperatures in the range of 200° C. Each of the top 132, bottom 136 and sidewalls 134 of the microwave chamber 130 may comprise an inner shell and an outer shell with a layer of insulation (e.g., fiberglass or a comparable insulating material) disposed therebetween. The microwave chamber 130 may be configured such that ceramic material 120 (e.g., ceramic materials cut into ceramic articles) pass continuously through the inside of the microwave chamber 130 of each microwave applicator 112, 114, 116, 118 along a flow indicated by arrows A and B. This flow approximates the path of the ceramic articles 120 through the microwave applicators 112, 114, 116 118, such as when the microwave drying apparatus 110 is a continuous throughput apparatus. The entrance 111 and exit 119 of the microwave drying apparatus 110 may be equipped with shielding and a plurality of operable gates (not shown) to reduce radiation leakage from the microwave applicators 112, 114, 116, 118 within the microwave drying apparatus 110 while still permitting the flow of ceramic articles 120 into and out of the microwave chambers 130 of each microwave applicator 112, 114, 116, 118.

To facilitate continuous throughput, the microwave drying apparatus 110 comprises a transport system 140 for transporting the ceramic articles 120 through the microwave chamber 130. The transport system 140 extends through the interior of the microwave chamber 130 from the entrance 111 to the exit 119. In one embodiment, the transport system 140 comprises a conveyor, such as a belt conveyor or a chain-link conveyor, on which the ceramic articles 120 may be positioned. In the illustrated embodiment, one or more wet and extruded ceramic articles 120 may be maintained within trays 121 that are passed through the microwave drying apparatus 110 on the conveyor of the transport system 140. However, it should be understood that the transport system 140 may comprise any suitable system for conveying ceramic articles through the microwave drying apparatus 110 from the entrance 111 to the exit 119. Accordingly, no particular limitation is intended as to the type of transport system used to convey the ceramic material through the microwave drying apparatus 110.

For each microwave applicator 112, 114, 116, 118, a microwave source 131 for directing microwave power into the microwave chamber 130 may be operatively coupled to the microwave chamber 130 by a microwave waveguide assembly 135 such that microwave energy generated by the microwave source 131 is transmitted to the microwave chamber 130. The microwave source 131 may be an adjustable microwave generator or source controllable by a controller 133 such that the power and frequency of the microwave energy generated by the microwave source 131 may be adjusted as will be discussed in more detail herein.

In one embodiment, the microwave source 131 employed to generate microwave energy may comprise any conventional magnetron with an adjustable power feature. The frequency of the generated microwave energy may be greater than about 900 MHz (0.9 GHz). In one embodiment, the frequency of the microwave energy generated by the microwave source is from about 10 MHz to about 100 GHz, and, more particularly, frequencies from about 1 GHz to about 2.45 GHz which generally correspond to the industrial microwave band in the United States. In other countries, other microwave frequencies may be utilized in the range from about 10 MHz to about 100,000 MHz. Generally, the microwave source 131 may be operable to vary the power of the emitted microwaves up to about 100 kW, although microwave generators capable of providing more or less power may be utilized. For example, the microwave source 131 may be capable of generating microwave energy having a power of about 50 kW to about 100 kW with a frequency of about 700 MHz up to about 1,200 MHz. Magnetrons of this type may generate microwave energy sufficient to rapidly raise the temperature within the ceramic material to a drying temperature. Several factors relate to the drying temperature and drying time including, without limitation, the load (e.g., the total weight of the ceramic material in the microwave chamber including the weight of moisture present within the ceramic material), the geometrical configuration of the ceramic material, the compositions of the ceramic material, the dimensions of the ceramic material, the positioning of the ceramic material, and the rate at which the ceramic material passes through the microwave drying apparatus.

To facilitate control of the microwave source 131 of each microwave applicator 112, 114, 116, 118, the microwave drying apparatus 110 may be electrically coupled to a controller 133, such as a programmable logic controller (PLC), general purpose computer or other hardware. The controller 133 may be operable to vary the power and frequency of the microwave energy generated by the microwave source 131 of each microwave applicator 112, 114, 116, 118. In one embodiment, the controller 133 is operable to send electrical signals to the microwave source 131 to vary the power and/or frequency of the microwave energy generated by the microwave source 131. The controller 133 may also be operable to receive signals from the microwave source 131 indicative of the power and/or frequency of the microwave energy being generated by the microwave source 131.

The amount of transmitted microwave energy dissipated in the microwave chamber 130 (e.g., the portion of the transmitted microwave energy which goes into heating and drying ceramic articles 120 positioned in the microwave chamber) may vary depending on such factors as load, distribution (e.g., the spacing between the ceramic articles), composition and geometry of the ceramic articles positioned in the microwave drying apparatus 110. Geometry of the ceramic material, as used herein, refers to the shape and structure of the ceramic material. For example, a ceramic article having a cellular structure with thin cell walls may reflect microwave energy differently than a ceramic article with thicker cell walls. Moreover, the composition of the ceramic material may also effect the manner in which the article reflects microwave energy. For example, a material with a low dielectric coefficient may reflect more microwave energy than a material with a higher dielectric coefficient (e.g., a ceramic article comprising graphite).

The microwave drying apparatus 110 may be operated such that a total microwave power value needed to dry a ceramic material having a certain size and shape is distributed among the microwave applicators 112, 114, 116, 118. In other words, each microwave applicator can be controlled to operate at some percentage of the total microwave power value such that the sum of the power applied by all of the microwave applicators is equal to 100% of the total microwave power value needed to dry a specific ceramic material or materials. The total microwave power value needed to dry a particular ceramic material may vary depending on factors including, without limitation, ceramic material composition, ceramic material mass (determined by the size, shape, configuration, and composition of the ceramic material), feed rate, target dryness, and the efficiency of the microwave applicators for a particular ceramic material.

One exemplary method of determining a total microwave power value (TP) needed to dry a ceramic material may be mathematically expressed by:

$$TP = \frac{\left(\frac{\text{Energy}}{100}\right) * DryT * \text{Weight}}{\left(\frac{\text{Efficiency} * TimeDA}{60}\right)}, \quad (1)$$

where:
Energy is the required energy at 100% efficiency to dry 100 pounds of wet ceramic material,
DryT is the desired dryness in percent,
Efficiency is the efficiency of drying the particular ceramic material in the microwave drying apparatus at a particular feed rate,
TimeDA is the duration of the ceramic material to be dried within the microwave drying apparatus, and
Weight is the total weight of the ceramic material to be dried within the microwave drying apparatus.

The above formula is only one example of a method of calculating the total microwave power value TP, and embodiments described herein are not limited to any particular method.

As described above, embodiments of the present disclosure provide for methods of drying ceramic materials, such as honeycomb-shaped ceramic articles, for example, by utilizing a substantially uniform or flat profile of energy per unit of water values for the second and subsequent microwave applicators of the microwave drying apparatus. Embodiments described herein may prevent the application of excessive power per unit of water content, which may thereby prevent overheating of the ceramic material, as well as prevent risks associated with the manual handling of hot ceramic materials. Embodiments may be particularly usefully for ceramic materials with a high dielectric constant, such as graphite-containing batch material, for example, that absorb more energy and gain heat as the part dries within the microwave drying apparatus.

Figure 2:
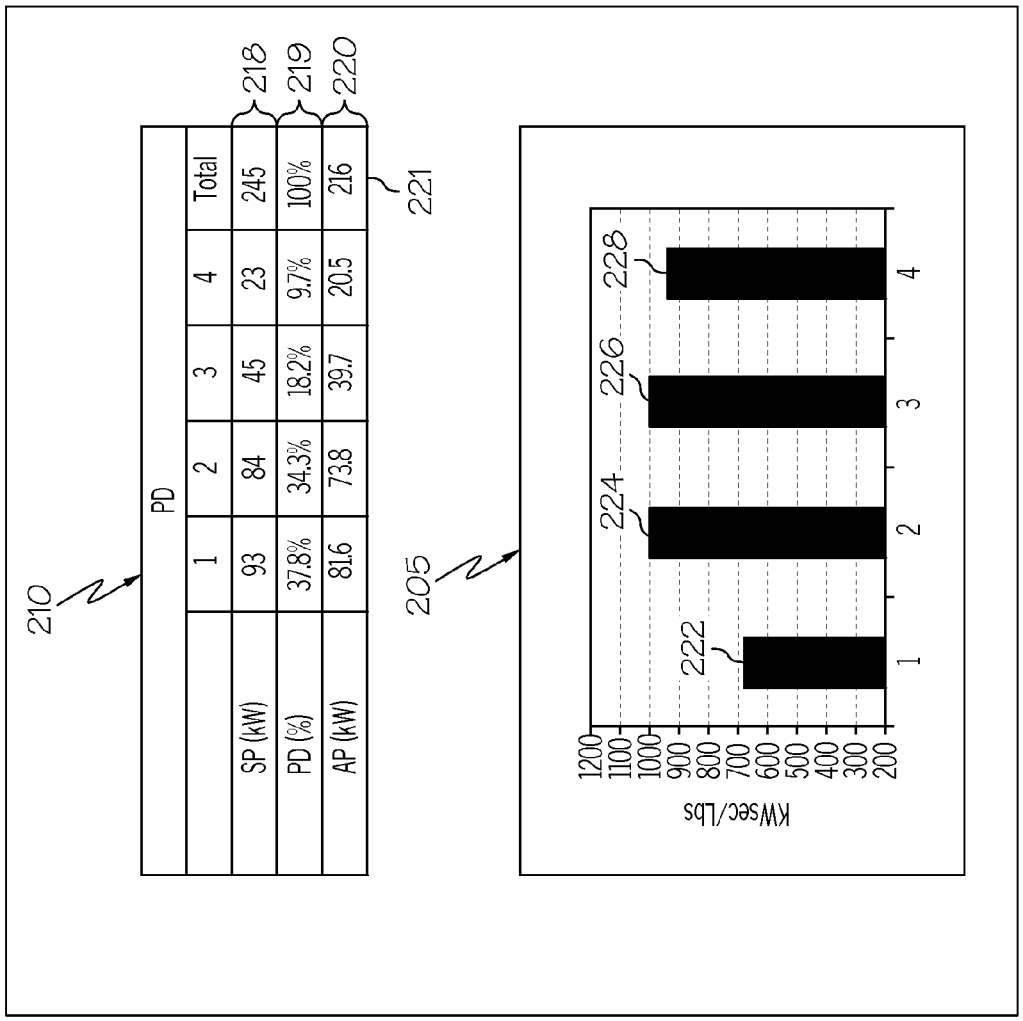
FIG. 2 is an exemplary interface of an exemplary microwave power calculation tool depicting an exemplary power distribution and corresponding energy per unit of water profile according to one or more embodiments shown and described herein.

As an example, an exemplary power distribution of among four microwave applicators in a microwave drying apparatus having a substantially uniform or flat profile is illustrated in graph 205 of FIG. 2. As described in more detail below, FIG. 2 illustrates at least a portion of an exemplary microwave power calculation tool 200 that may be used by an operator to perform the calculations and determinations of embodiments described herein. The graph 205 of FIG. 2 depicts an energy per unit of water value 222, 224, 226, 228 for each of the four microwave applicators. It should be understood that the energy per unit of water values 222, 224, 226, 228 depicted by graph 205 are exemplary in nature and not intended to be limiting in any manner. The exemplary microwave drying apparatus comprises a first microwave applicator (e.g., first microwave applicator 112 of FIG. 1) and three additional or remaining applicators (e.g., second, third and fourth applicators 114, 116, 118 of FIG. 1). The power distribution of the total microwave power value in kW among the microwave applicators is such that energy per unit of water values for the second (bar 224), third (bar 226) and fourth (bar 228) microwave applicators are substantially equal or uniform. In other words, an energy per unit of water profile for the second, third and fourth microwave applicators is substantially uniform such that substantially the same amount of microwave energy per unit of water is applied to the ceramic material at the second, third and fourth microwave applicators.

As described in more detail below, the substantially uniform power distribution of energy per unit of water values prevents under or over heating the ceramic material as it passes through the microwave drying apparatus. As used herein, the phrase substantially uniform means that the energy per unit of water values of the additional microwave applicators (e.g., the second, third and fourth microwave applicators) are within a numerical range such that the ceramic material being dried by the microwave drying apparatus does not burn and is consistently within a temperature range. The numerical range may vary depending on the composition, geometry and size of the ceramic material being dried. For example, energy per unit of water values within 100 kJ/lb of water for a particular ceramic material provide for a substantially uniform energy per unit of water profile such that the ceramic material does not burn and is consistently within a desired temperature range. For other ceramic materials, energy per unit of water values within 150 kJ/lb of water may dry the ceramic material without burning, for example.

After determining the total microwave power value, the power set-point for the first applicator 112 may be entered into the controller 133. The power distribution for the first applicator 112 may be determined based on equipment capacity or other processing requirements. Because the ceramic material comprises a relatively high water content as it enters the microwave drying apparatus 110, the energy per unit of water value for the first applicator 112 may not be of particular concern. Therefore, the power set-point for the first applicator 112 may be near capacity of the microwave generator (e.g., about 90% of the total power capacity of the microwave generator). As an example and not a limitation, if the first microwave applicator 112 has a maximum power output of 100 kW, the set point for the first applicator 112 may be about 92 kW. The 92 kW power set-point may be some percentage of the total microwave power value. The remaining percent of the total microwave power value is then distributed among the remaining microwave applicators (e.g., microwave applicators 114, 116 and 118). As illustrated in FIG. 2, the energy per unit of water value 222 for the first applicator may commonly be less than the energy per unit of water values for the remaining applicators because of the relatively high water content of the ceramic material as it enters the first applicator.

The power set-points for the remaining or additional microwave applicators may then be determined such that the energy per unit of water values for the additional microwave applicators are substantially equal. This provides for an energy per unit of water profile for the additional applicators that is substantially uniform. The energy per unit of water values should be within a tolerance to effectively heat and dry the ceramic material. The tolerance may vary depending on the type and configuration of the ceramic articles being dried within the microwave drying apparatus. As described above, in one embodiment, the energy per unit of water values should be within about 100 kJ/lb of water.

To prevent overheating of the ceramic articles within the microwave drying apparatus, the additional microwave applicators should be operated at power set-points such that they do not provide an energy per unit of water value that exceeds a potential energy per unit of water limit value. The potential energy per unit of water limit value may vary depending on the type of ceramic material being processed as well as the configuration of the microwave drying apparatus. The potential energy per unit of water limit value may be empirically determined for a particular class of ceramic materials such that any ceramic material falling within the class may have the particular energy per unit of water limit value applied when selecting the power set-points. Generally, the potential energy per unit of water limit value should be set such that the ceramic material being dried within the microwave drying apparatus does not exceed a maximum temperature in which the ceramic material may burn. The potential energy per unit of water limit value may vary depending on the composition, geometry, and size of the ceramic material being dried, as well as the efficiency of the ceramic material in the microwave drying apparatus. As an example, the power set-points of the additional microwave applicators for particular round ceramic articles having a drying efficiency between about 85% and about 90% should provide for energy per unit of water values that are less then 1100 kJ/lb of water. Power set-points for particular oval shaped ceramic articles having a similar drying efficiency should provide for energy per unit of water values that are less than 1150 kJ/lb of water. As an example, this maximum temperature for particular ceramic materials may be 180° C. for particular ceramic materials.

Power distributions of the microwave applicators corresponding to an array of potential energy per water content limit values may be calculated for future use in selecting appropriate power set-points. As described above, the power set-point for the first microwave applicator may be selected such that the first microwave applicator operates at near capacity of the microwave generator. The power distribution for the additional microwave applicators may be calculated as follows:

$$D_j = \frac{1/DryT - \sum_{k=1}^{j-1} D_k}{\frac{TP*TimeMA}{PEWL*IWL*LA*DryT} + 1/2}, \quad j = 2 \text{ to } n-1, \text{ and} \quad (2)$$

$$D_n = 100\% - \sum_{i=1}^{n-1} D_i, \quad (3)$$

where:

$D_J$ is the power set-point of microwave applicator $D_J$ in percent of the total microwave power value, $D_n$ is the power set-point of microwave applicator $D_n$ in percent of the total microwave power value, DryT is a percent of dryness target of the ceramic material, TP is the total microwave power value in kW, TimeMA is a time of the ceramic material in microwave applicator $D_j$ in seconds, PEWL is a potential energy per water content limit value in kJ/lb of water, IWL is an initial ceramic material water content in lbs, and LA is a number of ceramic materials per microwave applicator.

The above-calculations take into account the power distribution in percent of the previous microwave applicators. The above calculations may be run for multiple potential energy per unit of water limit values, the results of which may be provided in an arrange of power distributions. The above calculations may also be run for modifications to the other variables such as, but not limited to, the number of ceramic materials per microwave applicator, the total microwave power value, the percent of a dryness target, and the initial ceramic material water content.

The calculated power distributions may be provided in a table that may be accessed when determining the power set-points that will yield an advantageous power distribution among the microwave applicators. Exemplary power calculated distributions through processes described herein for potential energy per unit of water limit values associated with a particular exemplary ceramic material are provided in Table 1 below.

TABLE 1

| Potential Energy per Water content | FLAT PROFILE SELECTION Power Distribution (%) | | | | Energy/lbs of $H_2O$ | | | | Flat Profile Conditions | | | | |
|---|---|---|---|---|---|---|---|---|---|---|---|---|---|
| Limit (kJ/lb) | App1 | App2 | App3 | App4 | App1 | App2 | App3 | App4 | C1 | C2 | C3 | C4 | Ctotal |
| 50   | 37.8% | 2.20%  | 1.5%  | 58.5% | 676 | 50   | 35   | 2362 | 1 | 0 | 0 | 0 | 0 |
| 60   | 37.8% | 2.63%  | 1.9%  | 57.7% | 676 | 60   | 45   | 2352 | 1 | 0 | 0 | 0 | 0 |
| 70   | 37.8% | 3.06%  | 2.3%  | 56.8% | 676 | 70   | 55   | 2342 | 1 | 0 | 0 | 0 | 0 |
| 80   | 37.8% | 3.48%  | 2.7%  | 56.0% | 676 | 80   | 65   | 2332 | 1 | 0 | 0 | 0 | 0 |
| 90   | 37.8% | 3.91%  | 3.1%  | 55.2% | 676 | 90   | 75   | 2321 | 1 | 0 | 0 | 0 | 0 |
| 100  | 37.8% | 4.33%  | 3.5%  | 54.4% | 676 | 100  | 85   | 2311 | 1 | 0 | 0 | 0 | 0 |
| 960  | 37.8% | 33.21% | 18.1% | 10.9% | 676 | 960  | 945  | 1039 | 1 | 0 | 0 | 1 | 0 |
| 970  | 37.8% | 33.47% | 18.1% | 10.6% | 676 | 970  | 955  | 1019 | 1 | 0 | 0 | 1 | 0 |
| 980  | 37.8% | 33.74% | 18.2% | 10.3% | 676 | 980  | 965  | 1000 | 1 | 0 | 0 | 1 | 0 |
| 990  | 37.8% | 34.01% | 18.2% | 10.0% | 676 | 990  | 975  | 980  | 1 | 0 | 1 | 1 | 0 |
| 1000 | 37.8% | 34.27% | 18.2% | 9.7%  | 676 | 1000 | 985  | 960  | 1 | 1 | 1 | 1 | 1 |
| 1010 | 37.8% | 34.53% | 18.2% | 9.4%  | 676 | 1010 | 995  | 939  | 1 | 1 | 1 | 1 | 0 |
| 1020 | 37.8% | 34.80% | 18.3% | 9.1%  | 676 | 1020 | 1005 | 919  | 1 | 1 | 1 | 1 | 0 |
| 1030 | 37.8% | 35.06% | 18.3% | 8.9%  | 676 | 1030 | 1015 | 899  | 1 | 0 | 0 | 1 | 0 |

Power distribution tables may be stored on computer readable medium within a controller or a computer for access when selecting a proper power distribution. As described above, an appropriate power distribution is the power distribution that meets two conditions: 1) a flat energy per unit of water profile (e.g., the difference between the second microwave applicator and the additional microwave applicators in terms of energy per unit of water does not exceed 100 kJ/lb of water), and 2) the resultant energy per unit of water value in each applicator does not exceed a pre-established potential energy per unit of water limit value (e.g., 1100 kJ/lb of water for round ceramic articles of a particular composition and 1150 kJ/lb of water for other ceramic article shapes, such as oval, for example).

The first column of the Table 1 comprises the various potential energy per unit of water limit values in ascending order, the Power Distribution columns provide the power distributions for the particular potential energy per unit of water limit values, and the Energy/lbs of $H_2O$ columns provide the energy per unit of water values of four microwave applicators for the particular potential energy per unit of water limit values. The Flat Profile Conditions columns correspond to whether or not a particular condition is met. For example, column C1 compares the second microwave applicator with the third microwave applicator to determine whether or not the energy per unit of water values are separated by more than 100 kJ/lb of water. Similarly, column C2 compares the energy per unit of water values of the third and fourth microwave applicators and column C3 compares the energy per unit of water values of the fourth and second microwave applicators. Column C4 indicates whether or not one of the microwave applicators exceeds the potential energy per unit of water limit value. A "1" indicates that the condition is met while a "0" indicates that the condition is not met. Column Ctotal represents a multiplication of the values provided in columns C1-C4, with a "1" in the Ctotal column representing an optimum power distribution.

In one embodiment, a condition requiring that each microwave applicator have an energy per unit of water value that is less than the previous microwave applicator (except for the first and second microwave applicators) is utilized. This provides for an energy per unit of water profile that trends downwardly starting with the second microwave applicator. In other embodiments, this condition is not utilized in determining a power distribution.

The first power distribution in the table of power distributions that meets the above-described conditions is the power distribution that should be chosen and applied to the microwave applicators. The exemplary embodiment corresponding to Table 1 above incorporates the condition that the energy per unit of water profile should trend downwardly starting with the second microwave applicator. The first power distribution that meets the aforementioned conditions is indicated by a dashed box in Table 1. In this case, the indicated power distribution provides that no applicator applies more than 1100 kJ/lb of water to the ceramic material (Column C4 has a "1" present) and the energy per unit of water values for the second and remaining microwave applicators are within 100 kJ/lb of water of each other (Columns C1-C3 have a "1" present). Additionally, the fourth microwave applicator has less energy per unit of water than the third microwave applicator, and the third microwave applicator has less energy per unit of water than the second microwave applicator as illustrated in corresponding graph 205 of FIG. 2.

Still referring to Table 1, although the power distribution corresponding with a potential energy per unit of water limit value of 1010 kJ/lb of water also meets the above conditions, it is not the first power distribution (i.e., lowest potential energy per unit of water limit value) to do so. The first power distribution to meet the above conditions is chosen so that the minimum energy per unit of water limit value may be used to dry the ceramic material (e.g., 1000 kJ/lb of water in this example) to prevent overheating. Further, although the power distribution corresponding with a potential energy per unit of water limit value of 990 kJ/lb of water has energy per unit of water values that are within 100 kJ/lb of water of each other, the energy per unit of water value for the third applicator (975 kJ/lb of water) is less than the energy per unit of water value for the fourth microwave applicator (980 kJ/lb of water). Therefore, a "0" is present in Column C2.

Referring again to the power distribution illustrated in FIG. 2, which is different from the boxed power distribution of Table 1, the highest energy per unit of water value among the microwave applicators for the power distribution illustrated in FIG. 2 is 1000 kJ/lb of water associated with the second microwave applicator (bar 224 of graph 205). The third and fourth microwave applicators will apply 985 kJ/lb of water and 960 kJ/lb of water, respectively (bars 226 and 228 of graph 205). The selected power distribution provides that 37.8% of the total microwave power value is to be applied by the first microwave applicator, while 34.53%, 18.2% and 9.7% of the total microwave power value is to be applied by the second, third and fourth microwave applicators, respectively (row 219 of the power distribution table 210).

The power distribution may then be utilized to determine the power-set points of the microwave applicators. Referring to the power distribution (PD) table 210 of FIG. 2, if the total microwave power value 221 (i.e., the actual total microwave power value) for a particular batch of ceramic material is 216 kW, the first microwave applicator should apply 81.6 kW (37.8% of 216 kW) to the ceramic material, the second microwave applicator should apply 73.8 kW (34.3% of 216 kW), the third microwave applicator should apply 39.7 kW (18.2% of 216 kW), and the fourth microwave applicator should apply 20.5 kW (9.7% of 216 kW) for a total of 216 kW (row 220). To achieve these actual power ("AP") values, the power set-points may need to be set higher than the required total microwave power value because of variations in system parameters such as change in feed rate, headroom within the microwave applicators, and cellular gaps within the ceramic material.

As illustrated in table 210 of FIG. 2, the total power setpoint value may be calculated as 245 kW with the microwave applicator power set-points ("SP") based on the above-determined power distribution being 93 kW, 84 kW, 45 kW, and 23 kW for the first through fourth microwave applicators, respectively (row 218). These determined power set-points may then be entered into the controller 133 and the microwave drying apparatus 110 may be operated accordingly (see FIG. 1). Several batches of ceramic articles may be run to confirm the power set-points and to make any adjustments. Once the final power set-points are determined, they may be recorded and used for future production runs of the ceramic material.

Still referring to FIG. 2, the above described methods for calculating total microwave power values, efficiency values, and power distributions, as well as the operation of the selection of an optimum power distribution, may be incorporated into a microwave power calculation tool 200 configured as computer program or spreadsheet stored on tangible computer media and comprising a set of instructions that, when executed by the computer, causes the computer to perform the above calculations and determinations as described herein. The microwave power calculation tool 200 may be configured as having a graphical user interface that an operator may easily enter data and view output results.

As illustrated in the exemplary microwave power calculation tool 200 of FIG. 2, the microwave power calculation tool 200 may comprise a settings table (not shown), a power distribution table 210 and an energy per unit of water graph 205. It should be understood that many other configurations of the microwave power calculation tool 200 are possible and that embodiments of the present disclosure are not limited to the exemplary microwave power calculation tool 200 illustrated in FIG. 2. The settings table allows an operator to input settings into an input section. The input section may allow the operator to enter a product number that corresponds with a particular product type. For example, product "12" may correspond to a ceramic material or article of a particular composition having particular dimensions and weight as well as other properties. When the operator enters the product number, properties associated with the selected product may then be automatically populated into a properties section of the settings table. Exemplary properties may include, but are not limited to, microwave cavity length, ceramic articles per tray, headroom within applicators, trays per applicator, the energy required to dry at 100% efficiency for 100 pounds of wet ceramic material, ceramic article weight, time within the microwave drying apparatus, time within each microwave applicator, and approximate extrusion time per ceramic article. Other settings may also be entered into the input section of the setting table. For example, the length of each ceramic article may be inputted, as well as other settings such as target dryness, efficiency, desired gap between ceramic articles, number of microwave dryers, extrusion rate, water content, etc. The microwave power calculation tool 200 may be programmed to use the information inputted by the operator into the input section to generate outputs in an output section (not shown). The outputs provided by the microwave power calculation tool 200 may include, but are not limited to, a total actual power (i.e., a total microwave power value) and a belt speed to achieve a desired feed rate.

The total actual power value may then be populated into the power distribution table 210. The microwave power calculation tool 200 may determine the optimum power distribution using the arrange of power distributions described above. As described above, the power distribution table 210 may comprise actual power values AP (row 220), power distribution percentages ("PD(%)," row 219) and power set-points SP (row 218) for each microwave actuator. The calculated energy per unit of water values for each microwave applicator may be graphically illustrated in the energy per unit of water graph 205. In other embodiments, the energy per unit of water values may not graphically illustrated.

As described above, the determined power set-points SP may be entered into a microwave drying apparatus to dry ceramic articles of varying shapes and sizes. Because each microwave applicator of the microwave drying apparatus operates below a potential energy per unit of water limit value, and the energy per unit of water profile among the additional microwave applicators (i.e., the second and subsequent microwave applicators) is substantially uniform, the temperatures of the ceramic articles being heated by the microwave drying apparatus may be consistently within a temperature range that is well below a maximum ceramic material temperature (e.g., 180° C.).

Figure 3:
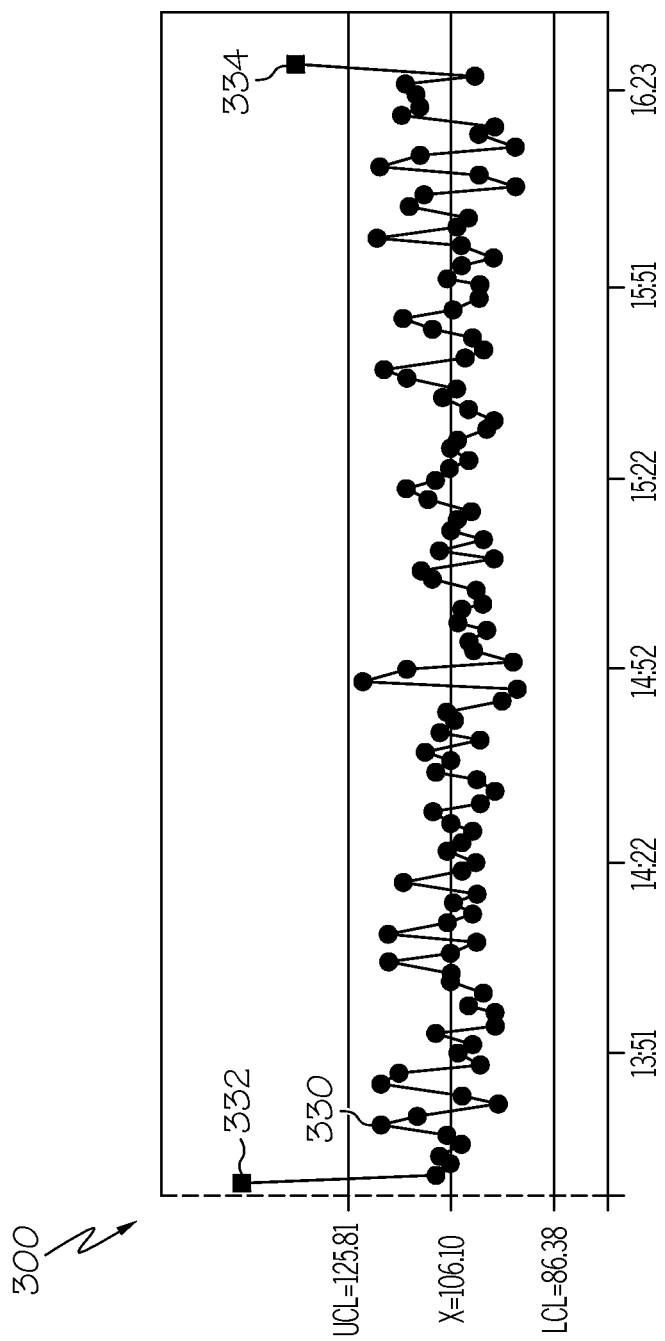
FIG. 3 is a graph that illustrates exemplary temperature data of ceramic materials exiting a drying apparatus according to one or more embodiments shown and described herein.
Figure 4:
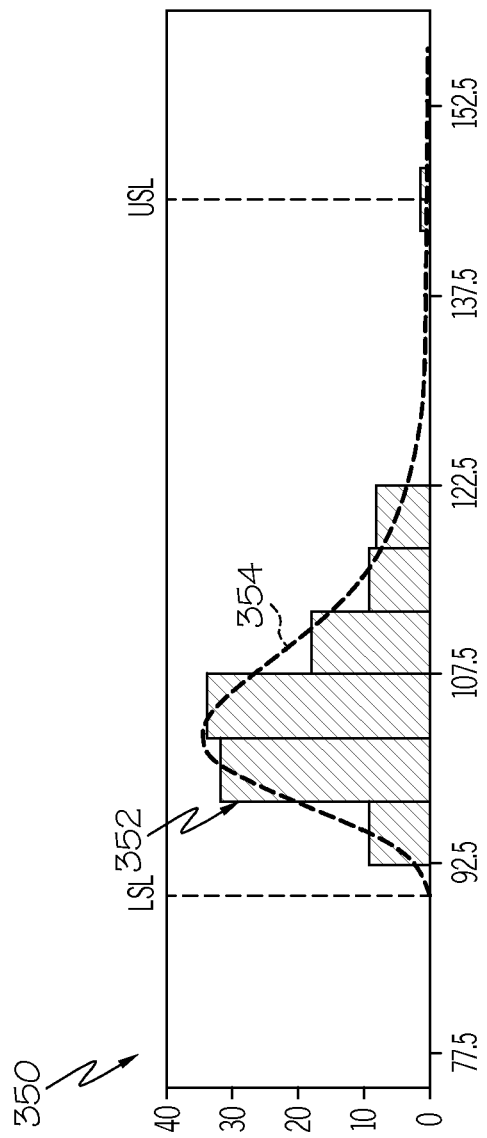
FIG. 4 is a bar graph that illustrates the exemplary temperature data of FIG. 3 according to one or more embodiments shown and described herein.

FIG. 3 depicts a graph 300 illustrating the temperature of round ceramic articles as they exit the microwave drying apparatus over the coarse of a length of time. The graph 300 is intended to be used only as an example and not as a limitation. The temperature was taken in the center of the trailing face of the ceramic articles as they exited the microwave drying apparatus. Each dot marker (e.g., dot marker 330) represents the temperature of a round ceramic article at the time indicated. As illustrated by graph 300, the average temperature of the round ceramic article was approximately 106.10° C. with an upper control limit of 125.81° C. and a lower control limit of 86.38° C. Therefore, ceramic materials dried by the processes described herein exit the microwave drying apparatus at consistent temperatures within a narrow temperature band defined by the upper and lower control limits, which increases production yield. Although the graph 300 illustrates two temperatures of round ceramic articles 332 and 334 that were above of the upper control limit, these temperature are still well below a maximum ceramic material temperature. FIG. 4 depicts a graph 350 illustrating a temperature distribution of the data depicted in FIG. 3. The bar graphs 352 indicate the number of ceramic articles exiting the microwave drying apparatus at temperatures within particular ranges. For example, approximately thirty ceramic articles of the batch of ceramic articles processed during the time frame of FIG. 3 exited the microwave drying apparatus at a temperature between about 97.5° C. and 102.5° C. Curve 354 is interpolated over the bars 352 and shows that most of the temperatures are consistently near the average temperature value and within the upper and lower control limits, indicating that the ceramic articles exiting the microwave drying apparatus are of a consistent temperature.

The methods, microwave drying apparatuses and systems described herein are particularly suitable for drying ceramic materials such as ceramic articles comprising thin wall ceramic green bodies, for example. Drying, as used herein, refers to a reduction in the liquid content of the ceramic article to a desired value. The heating and drying of the ceramic material is carried out to a degree where the ceramic material can be mechanically handled without causing any damage thereto or unacceptable deformation thereof. Embodiments provide standardized methods for drying a ceramic material with a microwave drying apparatus having multiple microwave applicators capable of varying a level of microwave power in accordance with applied power set-points. Embodiments may improve temperature stability and reduce development time by objectively determining the appropriate power set-points such that an energy per unit of water profile for the second and subsequent microwave applicators is substantially uniform.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for drying a ceramic material, comprising:
   determining a power set-point for a first microwave applicator of a drying apparatus;
   determining a power set-point for at least two additional microwave applicators in the drying apparatus such that a power distribution among the microwave applicators provides an energy per unit of water profile for the additional microwave applicators that is substantially uniform; and
   operating the microwave applicators at the determined power set-points as the ceramic material is passed through the drying apparatus,
   wherein the power set-points of the additional microwave applicators are defined by:

$$D_j = \frac{1/DryT - \sum_{k=1}^{j-1} D_k}{\frac{TP*TimeMA}{PEWL*IWL*LA*DryT} + 1/2}, \quad j = 2 \text{ to } n-1, \text{ and}$$

$$D_n = 100\% - \sum_{i=1}^{n-1} D_i,$$

where:
$D_j$ is the power set-point of microwave applicator $D_j$ in percent of the total microwave power value,
$D_n$ is the power set-point of microwave applicator $D_n$ in percent of the total microwave power value, DryT is a percent of dryness target of the ceramic material,
TP is a total microwave power value in kW,
TimeMA is the time of the ceramic material in microwave applicator $D_j$ in seconds,
PEWL is a potential energy per water content limit value in kJ/lb of water,
IWL is an initial ceramic material water content in lbs, and
LA is a number of ceramic materials per microwave applicator.

2. The method of claim 1 wherein the method further comprises determining the total microwave power value that is based at least in part on a water content of the ceramic material.

3. The method of claim 2 wherein the total microwave power value is further based at least in part on a mass of the ceramic material and a feed rate of the ceramic material through the drying apparatus.

4. The method of claim 2 wherein the power set-point of the first microwave applicator is such that the first microwave applicator operates at a power level that is about 90% of a power capacity of the first microwave applicator.

5. The method of claim 1 wherein energy per unit of water values for the additional microwave applicators are within about 100 kJ/lb of water of each other.

6. The method of claim 1 wherein energy per unit of water values for the additional microwave applicators do not exceed a potential energy per unit of water limit value.

7. The method of claim 6 wherein the potential energy per unit of water limit value is such that a temperature of the ceramic material within the drying apparatus does not exceed a maximum temperature of the ceramic material.

8. A method for drying a ceramic material comprising:
   determining a power set-point for a first microwave applicator of a drying apparatus;
   determining a power set-point for at least two additional microwave applicators in the drying apparatus such that a power distribution among the microwave applicators provides an energy per unit of water profile for the additional microwave applicators that is substantially uniform; and
   operating the microwave applicators at the determined power set-points as the ceramic material is passed through the drying apparatus;
   wherein energy per unit of water values for the additional microwave applicators do not exceed a potential energy per unit of water limit value, and the power set-points of each of the additional microwave applicators are defined by:

$$D_j = \frac{1/DryT - \sum_{k=1}^{j-1} D_k}{\frac{TP*TimeMA}{PEWL*IWL*LA*DryT} + 1/2}, \quad j = 2 \text{ to } n-1, \text{ and}$$

$$D_n = 100\% - \sum_{i=1}^{n-1} D_i,$$

where:
$D_j$ is a power set-point of microwave applicator $D_j$ in percent of a total microwave power value,
$D_n$ is a power set-point of microwave applicator $D_n$ in percent of the total microwave power value,
DryT is a percent of dryness target of the ceramic material, TP is the total microwave power value in kW, TimeMA is a time of the ceramic material in microwave applicator $D_j$ in seconds, PEWL is a potential energy per water content limit value in kJ/lb of water, IWL is an initial ceramic material water content in lbs, and LA is a number of ceramic materials per microwave applicator.

9. The method of claim 8 wherein the method further comprises determining a total microwave power value that is based at least in part on a water content of the ceramic material.

10. The method of claim 9 wherein the total microwave power value is further based at least in part on a mass of the ceramic material and a feed rate of the ceramic material through the drying apparatus.

11. The method of claim 9 wherein the power set-point of the first microwave applicator is such that the first microwave applicator operates at a power level that is about 90% of a power capacity of the first microwave applicator.

12. The method of claim 8 wherein the energy per unit of water values for the additional microwave applicators are within about 100 kJ/lb of water of each other.

13. The method of claim 12 wherein the potential energy per unit of water limit value is such that a temperature of the ceramic material within the drying apparatus does not exceed a maximum temperature of the ceramic material.

14. A method for processing a ceramic material in drying apparatus comprising a succession of microwave applicators, the method comprising:

determining a total microwave power value to be applied to an extruded ceramic material;

operating a first microwave applicator of the succession of microwave applicators at a first microwave applicator power set-point;

operating each of the remaining microwave applicators of the succession of microwave applicators at power set-points such that energy per unit of water values among the remaining microwave applicators do not vary by more than about 100 kJ/lb of water; and passing the ceramic material through the drying apparatus, wherein the power set-points of the remaining microwave applicators are defined by:

$$D_j = \frac{1/DryT - \sum_{k=1}^{j-1} D_k}{\frac{TP*TimeMA}{PEWL*IWL*LA*DryT} + 1/2}, \quad j = 2 \text{ to } n-1, \text{ and}$$

$$D_n = 100\% - \sum_{i=1}^{n-1} D_i,$$

where:

$D_j$ is the power set-point of microwave applicator $D_j$ in percent of the total microwave power value, $D_n$ is the power set-point of microwave applicator $D_n$ in percent of the total microwave power value, DryT is a percent of dryness target of the ceramic material, TP is the total microwave power value in kW, TimeMA is the time of the ceramic material in microwave applicator $D_j$ in seconds, PEWL is a potential energy per water content limit value in kJ/lb of water, IWL is an initial ceramic material water content in lbs, and LA is a number of ceramic materials per microwave applicator.

15. The method of claim 14 wherein the total microwave power value is based at least in part on a water content of the ceramic material.

16. The method of claim 15 wherein the total microwave power value is further based at least in part on a mass of the ceramic material and a feed rate of the ceramic material through the drying apparatus.

17. The method of claim 14 wherein the first microwave power set-point for the first microwave applicator is such that the first microwave applicator operates at a power level that is about 90% of a power capacity of the first microwave applicator.

18. The method of claim 14 wherein a potential energy per unit of water limit value is such that a temperature of the ceramic material within the drying apparatus does not exceed a maximum temperature of the ceramic material.

* * * * *